United States Patent [19]
Bayer et al.

[11] Patent Number: 6,028,008
[45] Date of Patent: Feb. 22, 2000

[54] CALIBRATION STANDARD FOR PROFILOMETERS AND MANUFACTURING PROCEDURE

[75] Inventors: Thomas Bayer, Aidlingen-Dachtel; Johann Greschner, Pliezhausen; Klaus Meissner, Herrenberg, all of Germany

[73] Assignee: International Business Machines Corporation, Armonk, N.Y.

[21] Appl. No.: 08/987,213

[22] Filed: Dec. 9, 1997

[51] Int. Cl.[7] .................................................. H01L 21/00
[52] U.S. Cl. ........................... 438/734; 216/59; 216/84; 156/345; 438/9; 438/35
[58] Field of Search .................................. 216/2, 59, 60, 216/79, 84, 85; 438/8, 9, 14, 719, 734, 735; 156/345 MT, 345 LC

[56] References Cited

U.S. PATENT DOCUMENTS 5,792,673  8/1998  Nagura ..................................... 438/9 X
5,805,421  9/1998  Livengood et al. ................... 216/59 X

*Primary Examiner*—William Powell
*Attorney, Agent, or Firm*—Ronald L. Drumheller

[57] ABSTRACT

The invention relates to calibration standards which are used chiefly for the calibration of profilometers and in atomic force- and scanning probe microscopes. The calibration standard has one step of defined height H or a multi-step system formed of several steps of the same step-height H and consisting of exactly one material. The manufacturing procedure for the calibration standard requires only a single masking layer for each of the different versions in the form of a one-step standard or a multi-step system.

14 Claims, 2 Drawing Sheets

CALIBRATION STANDARD FOR PROFILOMETERS AND MANUFACTURING PROCEDURE

The invention relates to calibration standards which are used chiefly for the calibration of profilometers, in atomic force microscopes, and scanning probe microscopes and also as a procedure for the manufacture of such calibration standards.

Stepped-height standards which are used for profilometers, atomic force- and scanning probe microscopes usually consist of a two-layer system. The known stepped-height calibration standards consist of one step of silicon dioxide on silicon or of one step of metal on glass.

When such stepped-height calibration standards are used, e.g. in mechanical profilometers, a grid is cut on the surface using a diamond point. The contact pressure is of the order of $10^{-3}$ to $10^{-5}$ gramme. On all surfaces, the diamond probe leaves behind a variable number of fine or very fine lines. If the step of a stepped-height calibration standard consists of different materials, the diamond needle leaves behind scratches of different depths in the various materials. Depending upon the method of calibration selected to calibrate the calibration standard this can lead to measurement errors of several nanometres.

If such a stepped-height calibration standard is used in atomic force or scanning probe microscopes, measurement errors can also arise because of the different materials used for the standard. For example, the surfaces of silicon dioxide and silicon are, respectively, hydrophilic and hydrophobic and this property can similarly lead to measurement errors of the order of a few nanometres as a consequence of the inter-reaction between the point of the atomic force- or scanning probe microscope and the surface of the calibration standard being used at the time.

The known stepped-height standards, moreover, consist of only one step and cannot, therefore, be used simultaneously as linearity standards for the calibration of the z-axis of profilometers.

U.S. Pat. No. 5,278,028 describes a procedure for the manufacture of binary Fresnell lenses with multiple discrete phases. The Fresnell lenses are fabricated as a two-layer system with a multi-step structure made of etchable material upon a smooth substrate which is not attacked by etching agents. The multi-step structure is produced by using the known semi-conductor production procedure where a photolithographic stage using a photo-mask is employed for building up each individual step. This requires a justification process so that the successive mask patterns can be positioned with the necessary degree of precision and that the permissible tolerances in the etchable material are not exceeded.

The object of the invention is basically to provide a calibration standard which does not exhibit the identified measurement errors and which can be produced at an economic price.

This object is realised by the calibration standard conforming to the invention and set out in Claim 1 as well as by the procedure for its manufacture in accordance with Claim 8.

The single-step calibration standard conforming to the invention is made of only one material. The point of a profilometer or of an atomic force- or scanning probe microscope interreacts with the same material over the whole surface area and in the region of the step of the calibration standard. This considerably increases the level of measurement accuracy and simplifies the manufacturing procedure because apart from a masking layer, no further layer has to be applied to the substrate which forms the calibration standard.

Further advantageous forms of the invention are described in the Subordinate Claims.

It is particularly advantageous to produce a calibration standard with a multi-step system consisting of several steps of the same height. Such a calibration standard can also be used as a linearity standard for the calibration of the z-axis of profilometers.

The invention is now described at length by means of an application example where reference is made to the diagrams which illustrate the following in detail:

FIG. 1c) shows the schematic cross-section of the calibration standard in accordance with the invention and FIGS. 1a)–1c) The most important production stages which are necessary in the manufacturing procedure.

Figure 1A:
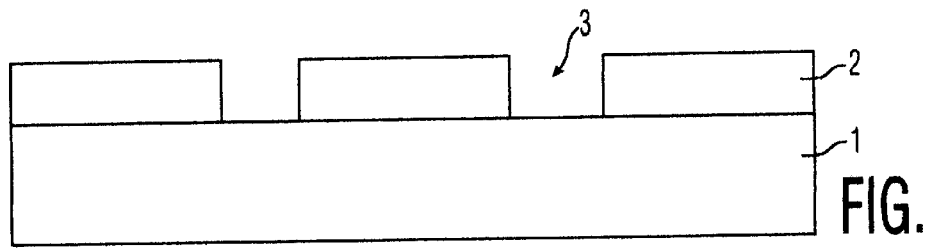
Figure 1B:
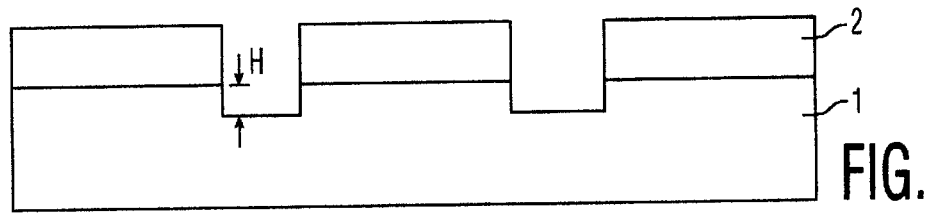
Figure 1C:
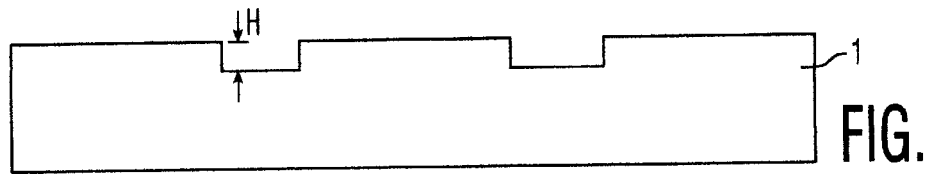

The calibration standard displayed in FIG. 1c) has one or several simple steps with a defined step-height of H. The simple steps are formed in the material of the calibration standard. The most suitable material is that of a single-crystal nature since the steps are produced by micro-mechanical methods. Silicon is particularly well-suited for this purpose.

Depending upon the application field of the calibration standard the step-height H can lie in the region of a few nanometres up to a few micrometres. The step-width also lies within this range.

FIG. 1a) shows a support substrate 1 made of a single-crystal material on which a masking layer 2 is applied, which possesses an aperture 3 of a defined width previously produced by micro-fabrication methods.

While retaining the defined width, the aperture is transferred to the support substrate and hollowed out to a defined depth of H as illustrated in FIG. 1b).

The transfer of the masking structure into the support substrate therefore calls for extremely uniform and highly selective etching processes. Those suitable are, for example, alkaline crystal-dependent etching agents or isotropic etching agents in buffered ammonium fluoride. In particular, isotropic etching agents in buffered ammonium fluoride make it possible, as a consequence of the extremely low etching rate, to produce steps of step-height H in the nanometer range with the utmost precision.

An oxidation stage can also be usefully employed for the formation of the step, where that part of the surface of the substrate 1 defined by the mask aperture 3 is oxidized and the oxide thus formed is then removed.

The most suitable material for the masking layer 2 is to be selected taking into account the chosen etching process. In this context, materials such as "Fotolack", silicon dioxide, silicon nitride or metals should be considered.

By using extremely uniform and highly-selective etching processes, it is possible to achieve uniformity of step-height H over the usable range of the calibration standard of a few square millimeters up to 5.

After the step has been produced in the support substrate, the masking layer is removed.

Figure 2:
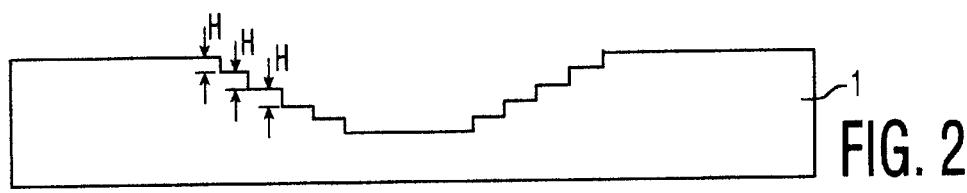
FIG. 2 is a schematic cross-section through a preferred design form of the calibration standard and FIGS. 3a)–3g) show the necessary procedure stages for the manufacture of the design form illustrated in FIG. 2.

FIG. 2 shows a preferred design form of the calibration standard with a multi-step system. This multi-step system in the support substrate 1 is formed by several steps of the same step-height H. The steps can be of the same or different width measurements.

Figure 3A:
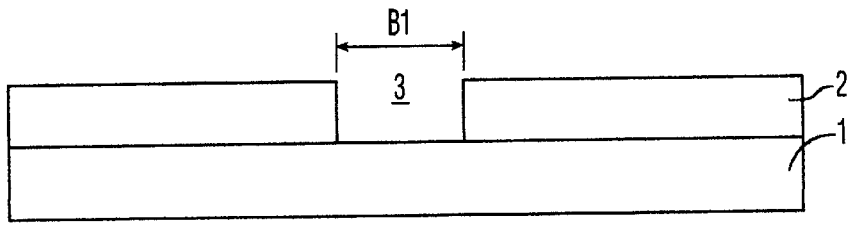

The essential manufacturing stages for the calibration standard with the multi-step system are illustrated in FIGS. 3a) to 3g).

In FIG. 3a) can be seen the support substrate 1 covered with a masking layer 2 of adequate thickness and containing an aperture 3 of defined width B1.

Figure 3B:
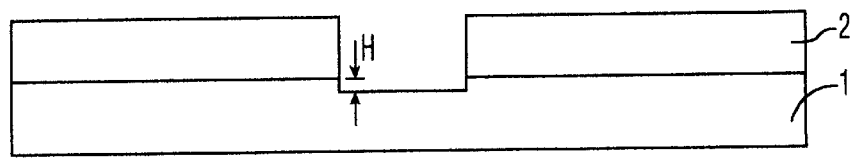

By using the same methods as already described for the manufacture of the single-step standard and while retaining the defined width B1, the aperture is transferred and hollowed out into the support substrate 1 until a depth of H is reached; this is illustrated in FIG. 3b)

Ideally, an extremely highly-selective process should be selected for the transfer of the masking aperture into the substrate in order that during this process stage the masking layer 2 loses none, or at least the very minimum, of its original thickness.

Figure 3C:
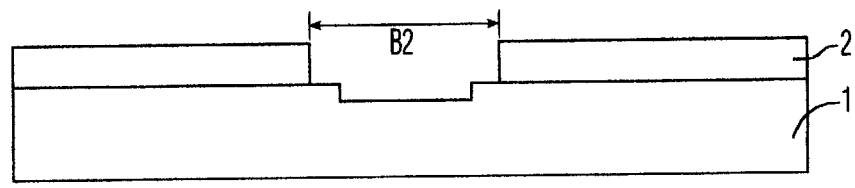

After this, the opening in the masking layer by etching is extended to a width of B2 so that, bordering on the existing free surface of the support substrate in the area of the masking aperture, a further element of the substrate surface is exposed, FIG. 3c). The isotropic shrinkage characteristics of the etched mask facilitate the widening of the masking aperture but this certainly reduces the thickness of the masking material.

Figure 3D:
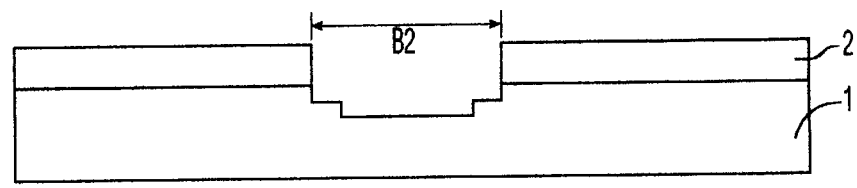

In FIG. 3d), the wider second aperture has been transferred and hollowed out to the defined depth H into the support substrate while retaining its width B2 and, at the same time, the first aperture has been once more transferred and hollowed out into the support substrate to the defined depth H while retaining its defined first width B1. In this way, and as shown in FIG. 3d, a multi-step system having two steps of similar step-height H has been produced.

Figure 3E:
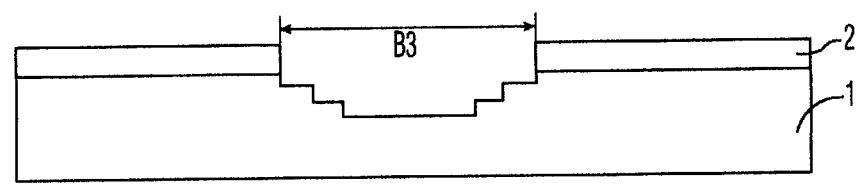
Figure 3F:
Figure 3G:
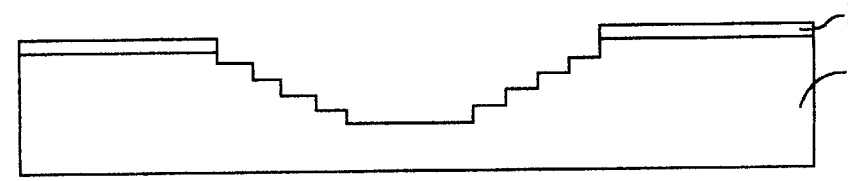

The procedural stages of widening the aperture in the masking layer by etching the masking layer and the transfer of this widened aperture into the support substrate by etching the substrate can now be repeated as often as necessary until the desired number of steps of equal height has been formed in the multi-step system. FIG. 3e) to FIG. 3g) illustrate typical multi-step systems with three, four and five steps.

After the final transfer and hollowing-out stage [of the etching process] has been completed, the remaining masking layer which has been repeatedly shrunk in thickness by the multiple widening stages of the masking aperture is removed. The calibration standard with a multi-step system as shown in FIG. 2 is the end result.

As can be seen from the process sequence displayed in FIGS. 3a) to g), only one masking layer applied once to the support substrate is required for the manufacture of a number of steps in the multi-step system. Consequently, this procedure is considerably less laborious and more favourable cost-wise in comparison with procedures which require a separate photo-lithographic stage for each step.

A further advantage of this procedure results directly from the use of only a single masking layer because in this way it is guaranteed that the apertures to be transferred into the support substrate are self-adjusting relative to one another and laborious justification stages are not required.

A point to be given attention, certainly, is that the maximal possible thickness of the mask is the limiting factor for the width of the steps.

Figure 4:
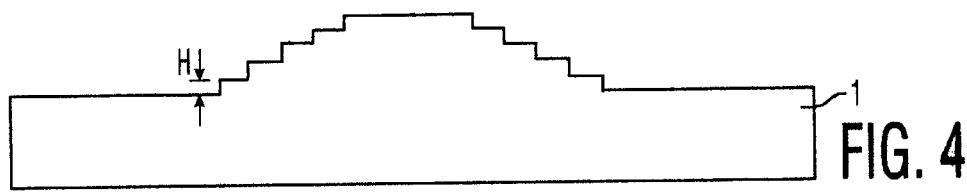
FIG. 4 is a schematic cross-section through a further design form of the calibration standard.

The design form illustrated in FIG. 4 can be easily manufactured because the multi-step system produced in the support substrate by the stages shown in FIGS. 2a) to 2g) can be filled with a suitable material and the support substrate then removed.

Such calibration standards with a multi-step system are outstandingly suitable for use as a linearity standard because of the precisely equal step-height H of all their steps. The possible difference in width of the steps can be caused by variations in the widening process but is of no importance for the measurement accuracy of the linearity standards.

If in addition to the uniformity of the step-height, the absolute height is also known, these calibration standards can be used as combined standards for linearity and the z-stroke, e.g. of a profilometer.

If required, the different design forms of the calibration standard can be uniformly coated with a further material. In order to be able to use the calibration standard in a scanning-tunnel microscope, for example, a conductive layer would be desirable, consisting of e.g. metal or graphite. On the other hand, for the use of the calibration standard in a profilometer with a diamond needle, a diamond-like carbon layer with a good tribological behaviour would be preferable and this would extend the working life of the standard.

When carrying out the coating operation care must be taken that the distribution of the layer thickness is constant over the total usable surface of the calibration standard.

We claim:

1. Calibration standard for a profilometer
   with one step of defined height H, where the step is formed micro-mechanically in the existing calibration standard (1) made of exactly one material.

2. Calibration standard for a profilometer
   with a multi-step system formed from several steps of equal step height H where the calibration standard consists of exactly one material.

3. Calibration standard for a profilometer in accordance with claim 1
   where the material of the calibration standard is a single-crystal material and preferably silicon.

4. Calibration standard for a profilometer in accordance with claim 2
   where all steps are of the same width.

5. Calibration standard for a profilometer in accordance with claim 1
   where the calibration standard is uniformly coated.

6. Calibration standard for a profilometer in accordance with claim 5
   where the material for the uniform coating includes electrically-conducting layers and layers with favourable tribological properties.

7. Calibration standard for a profilometer in accordance with claim 1
   where the step-height H lies within the range of nanometres to micrometres.

8. Procedure for the manufacture of a calibration standard which comprises the following stages:
   a) the provision of a support substrate (1) from a single-crystal material
   b) application of a masking layer (2) upon the supporting substrate (1)
   c) formation of an initial aperture (3) of defined initial width B1 in the masking layer (2)
   d) transfer of this initial aperture (3) and hollowing-out to a defined depth H in the support substrate (1) while retaining the defined initial width B1
   c) Removal of the masking layer (2).

9. Procedure for the manufacture of the calibration standard in accordance with claim 8
   where the additional following stages are carried out after stage d) and before stage e)

d1) Widening of the initial aperture in the masking layer (2)

d2) Transfer of the widened second aperture and hollowing-out to the defined depth H in the support substrate (1) while retaining tile second width B2 and simultaneous renewed transfer of the initial aperture and hollowing-out to the defined depth H in the support substrate (1) while retaining the defined initial width B1 d3) Repetition of stages d1) and d2) as often as necessary until the desired number of apertures of different width B and of defined depth H have been transferred into the support substrate (1).

10. Procedure for the manufacture of the calibration standard in accordance with claim 8 where the material of the support substrate (1) is single-crystal silicon.

11. Procedure for the manufacture of the calibration standard in accordance with claim 9 where stage d1) and stage d2) are carried out by alkaline crystal-dependent etching agents or isotropic etching agents in buffered ammonium fluoride.

12. Procedure for the manufacture of the calibration standard in accordance with claim 8 where stage d1) is carried out by isotropic shrinkage.

13. Procedure for the manufacture of the calibration standard in accordance with claim 8 where the additional following stage is carried out after completing stage e)

f) uniform coating of the calibration standard manufactured in accordance with stages a) to e).

14. Use of the calibration standard in accordance with claim 2 as a combined standard for the determination of the linearity and the stroke of a profilometer in the z-direction.

* * * * *